United States Patent [19]

Okamoto

[11] Patent Number: 4,997,903
[45] Date of Patent: Mar. 5, 1991

[54] POLYCARBONATE-MADE OPTICAL ARTICLE

[75] Inventor: Masaya Okamoto, Ichihara, Japan

[73] Assignee: Idemitsu Petrochemical Co., Ltd., Tokyo, Japan

[21] Appl. No.: 231,151

[22] Filed: Aug. 11, 1988

[30] Foreign Application Priority Data

Aug. 27, 1987 [JP] Japan .................................. 62-213252

[51] Int. Cl.$^5$ ............................................ C08G 64/14
[52] U.S. Cl. .................................... 528/198; 528/125; 528/171; 528/174; 528/196; 528/202
[58] Field of Search ............... 528/198, 202, 125, 171, 528/174

[56] References Cited

U.S. PATENT DOCUMENTS 4,774,315 9/1988 Miller ................................... 528/198

FOREIGN PATENT DOCUMENTS 20993 2/1976 Japan .................................. 528/198

Primary Examiner—Harold D. Anderson
Attorney, Agent, or Firm—Wyatt, Gerber, Burke & Badie

[57] ABSTRACT

The invention provides an optical article, such as optical disc substrates and optical fibers, made of a polycarbonate resin suitable for manufacturing articles for optical applications in respect of the high mechanical strength, e.g., high impact strength, and low birefringence by virtue of the unique molecular structure having molecular chain ends stoppered with 4-cumyl phenol as the chain-terminal stopping agent in the polycondensation reaction of a dihydric phenol compound, e.g., bisphenol A, and phospgene along with a narrowly specified viscosity-average molecular weight in the range from 10,000 to 17,000.

7 Claims, No Drawings

POLYCARBONATE-MADE OPTICAL ARTICLE

BACKGROUND OF THE INVENTION

The present invention relates to a novel polycarbonate-made optical article or, more particularly, to an optical article, such as optical disc substrates and optical fibers, made of a polycarbonate resin particularly suitable as a material for forming such optical articles.

Needless to say, acrylic resins are known as a material suitable for forming transparent articles for optical uses such as substrates of optical discs because of their characteristics such as high transparency, high flowability in molding, low birefringence and the like (see, for example, Japanese Patent Kokai No. 56-131654).

However, acrylic resins are generally poor in their heat resistance and shaped articles of the resin are poor in the impact strength and may sometimes be warped upon exposure to moisture.

It has been proposed in Japanese Patent Kokai No. 58-180553 that the above mentioned disadvantages of acrylic resins can be overcome when articles such as optical discs are formed of a polycarbonate resin having a viscosity-average molecular weight of 15,000 to 18,000 as the molding material. Such a high-molecular polycarbonate resin, however, is not quite satisfactory in the flowability in molding and, in particular, is defective in respect of the high birefringence which is very detrimental when formed articles of the resin are used in an optical application. The deficiency in respect of the low flowability in molding can be partly compensated for by using a polycarbonate resin of a relatively low molecular weight or by increasing the molding temperature though being accompanied by various disadvantages such as decreased mechanical strengths of the shaped articles and eventual appearance of stringiness of the molded articles necessarily to cause interruption of the process of continuous molding.

Under such circumstances, various efforts have been made to obtain an optical article made of a polycarbonate resin free from the above described problems and disadvantages in the prior art optical articles made of conventional transparent synthetic resins.

SUMMARY OF THE INVENTION

The above described disadvantages of the prior art plastic resin-made optical articles are overcome by the present invention completed on the base of a discovery that a specific polycarbonate resin having a low birefringence is very satisfactory for the purpose when the resin has an appropriate molecular weight and has a structure of the molecular chain terminals obtained by using a specific chain-terminal stopping agent in the polycondensation reaction of a dihydric phenol compound and phosgene.

Thus, the present invention provides an optical article, such as optical disc substrates and optical fibers, made of a polycarbonate resin having a viscosity-average molecular weight in the range from 10,000 to 17,000, which is a product of a polycondensation reaction of a dihydric phenol compound and phosgene using 4-cumyl phenol as the chain-terminal stopping agent.

DETAILED DESCRIPTION OF THE PREFERRED EMBODIMENTS

As is described above, the polycarbonate resin as a base material of the inventive optical article is characterized by the specified viscosity-average molecular weight and the unique structure of the molecular chain ends obtained by using a specific chain-terminal stopping agent in the polycondensation reaction. The polycarbonate resin as a base material of the inventive optical article can be easily molded by, for example, injection molding, compression molding and the like and exhibits a high mechanical strength, high transparency and low birefringence when the resins formed into articles used in various optical applications including optical disc substrates.

The polycarbonate resin as the base material of the inventive article for optical use should necessarily be prepared by using 4-cumyl phenol as the molecular chain-terminal stopping agent and have a viscosity-average molecular weight in the range from 10,000 to 17,000.

A polycarbonate resin having a viscosity-average molecular weight exceeding 17,000 exhibits a high birefringence while a polycarbonate resin having a viscosity-average molecular weight smaller than 10,000 exhibits low mechanical strengths even when the resin has the same molecular structure relative to the chain terminals as the above specified unique polycarbonate resin.

The polycarbonate resin used for forming the inventive optical article is synthesized by using one or a combination of various dihydric phenols and phosgene as the reactants of the polycondensation reaction and 4-cumyl phenol as a molecular chain-terminal stopping agent (see, for example, Japanese Patent Kokai No. 51-20993 and Japanese Patent Publication No. 62-10541).

Preferred dihydric phenol compound used in the polycondensation reaction with phosgene is a bis(4-hydroxyphenyl) compound represented by the general formula

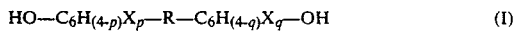

$$HO-C_6H_{(4-p)}X_p-R-C_6H_{(4-q)}X_q-OH \qquad (I)$$

in which R is a divalent group or atom selected from the class consisting of alkylene groups having 1 to 15 carbon atoms substituted or unsubstituted with a phenyl group, alicyclic groups having 3 to 15 carbon atoms, $-O-$, $-S-$, $-SO-$, $-SO_2-$ and $-CO-$, X is an alkyl or aryl group or a halogen atom and p and q are each 0, 1 or 2.

Particular examples of the above defined bis(4-hydroxyphenyl) compound include bis(4-hydroxyphenyl) methane, bis(4-hydroxyphenyl) ether, bis(4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl) ethane, 2,2-bis(4-hydroxyphenyl) propane, 2,2-bis(4-hydroxyphenyl) butane, 1,1-bis(4-hydroxyphenyl) cyclohexane, 2,2-bis(4-hydroxy-3,5-dibromophenyl) propane, 2,2-bis(4-hydroxy-3,5-dichlorophenyl) propane, 2,2-bis-(4-hydroxy-3-bromophenyl) propane, 2,2-bis(4-hydroxy-3-chlorophenyl) propane, 2,2-bis(4-hydroxy-3,5-dimethylphenyl) propane, 1,1-bis(4-hydroxyphenyl)-1-phenyl ethane, bis(4-hydroxyphenyl) diphenyl methane and the like.

The polycarbonate resin as the base material of the inventive optical article having the aforementioned terminal groups can be easily prepared by the reaction of a dihydric phenol compound and phosgene using 4-cumyl phenol as the molecular-weight controlling agent or molecular chain-terminal stopping agent. 4-

Cumyl phenol is a compound expressed by the structural formula $C_6H_5-C(CH_3)_2-C_6H_4-OH$. Accordingly, the polycarbonate resin obtained by using 4-cumyl phenol as the chain-terminal stopping agent has a molecular structure represented by the general formula

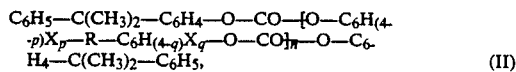
(II)

in which R, X, p and q each have the same meaning as defined above for the general formula (I) and n is a positive integer having such a value that the polycarbonate resin may have a viscosity-average molecular weight in the range from 10,000 to 17,000, $C_6H_4$, $C_6H_{4-p}X_p$ and $C_6H_{4-q}X_q$ in the formula each indicating an unsubstituted or substituted 1,4-phenylene group. The viscosity-average molecular weight of a polycarbonate resin can be calculated from the well known equation given by Schnell, i.e. $[\eta] = 1.23 \times 10^{-5} \overline{M}_{0_{S \cdot M}}^{0.83}$, the intrinsic viscosity being measured at 20° C. in a methylene chloride solution.

In a typical procedure for the polycondensation reaction, for example, the polycarbonate resin is obtained by the interfacial polycondensation reaction by the so-called phosgene method in which the dihydric phenol compound dissolved in an inert organic solvent is reacted with phosgene by using 4-cumyl phenol as the chain-terminal stopping agent. Also, the polycarbonate resin is obtained by the so-called pyridine method in which phosgene is blown into a solution prepared by dissolving a dihydric phenol compound and 4-cumyl phenol in pyridine or in a solvent mixture of pyridine and an inert solvent. The polycarbonate resin obtained by way of either of these methods is purified and pulverized according to a routine procedure.

The present invention provides an optical article made of a polycarbonate resin particularly suitable as a material for forming articles of optical use having a high impact strength and low birefringence.

In the following, the polycarbonate resin used as a material of the inventive optical article is described in more detail by way of examples.

Synthesis of a polycarbonate oligomer

An aqueous alkaline solution of bisphenol A, i.e. 2,2-bis(4-hydroxyphenyl) propane, was prepared by dissolving 60 kg of bisphenol A in 400 liters of an aqueous 5% solution of sodium hydroxide.

Then, a continuous reaction was carried out for 3 hours in a tubular reactor having an inner diameter of 10 mm and a length of 10 meters into which the alkaline solution of bisphenol A prepared above and kept at room temperature was introduced at a rate of 138 liters/hour together with introduction of methylene chloride at a rate of 69 liters/hour through an orifice plate. Phosgene gas was blown into the reactor at a rate of 10.7 kg/hour and cocurrently contacted with the liquid flowing therein.

The tubular reactor was made of a duplex tube and the space between the walls served as a jacket through which cooling water was passed so that the reaction mixture discharged out of the reactor was controlled at a temperature of 25° C. The pH of the discharged reaction mixture was adjusted in the range from 10 to 11 by introducing a 0.1N aqueous solution of sodium hydroxide.

The reaction mixture discharged out of the reactor tube over a reaction time of 3 hours was kept standing to effect phase separation into aqueous and organic phases and the aqueous phase was discarded to give 220 liters of the organic phase of methylene chloride as the solvent which was further diluted by adding 170 liters of methylene chloride with thorough agitation to give a solution containing the polycarbonate oligomer in a concentration of 317 g/liter. The polycarbonate oligomer obtained in this manner had an average degree of polymerization of 3 to 4.

Preparation of polycarbonate resin $A_1$

4-Cumyl phenol in an amount of 0.68 mole was dissolved in 9.0 liters of the solution of the polycarbonate oligomer obtained in the above described manner. The polycarbonate oligomer solution containing 4-cumyl phenol was admixed with an aqueous solution separately prepared by adding 5.2 ml of triethyl amine to an aqueous solution of 31.2 g (0.78 mole) of sodium hydroxide in 600 ml of water followed by stirring at room temperature for 1 hour at a velocity of 500 rpm. Thereafter, the reaction mixture was admixed with 9.6 liters of methylene chloride and an aqueous solution prepared by adding 611 g of bisphenol A and 357 g of sodium hydroxide to 5070 ml of water and agitated for additional 2 hours at room temperature at a velocity of 500 rpm.

Finally, the reaction mixture was diluted by adding 5 liters of methylene chloride and washed successively first with 5 liters of water, then with 5 liters of 0.01N aqueous sodium hydroxide solution for an alkaline condition, thirdly with 5 liters of 0.1N hydrochloric acid for an acidic condition and finally with 5 liters of water followed by stripping of methylene chloride by evaporation to give a polycarbonate resin, which is referred to as the resin $A_1$ hereinbelow, in the form of chips.

The resin $A_1$ thus obtained had a viscosity-average molecular weight of $1.5 \times 10^4$ and a glass transition temperature $T_g$ of 148° C.

Preparation of polycarbonate resin $A_2$

The procedure of reaction was substantially the same as in the preparation of the polycarbonate resin $A_1$ described above except that the amount of 4-cumyl phenol was increased from 0.68 mole to 0.82 mole and the amount of sodium hydroxide was increased from 31.2 g (0.78 mole) to 37.6 g (0.94 mole).

The polycarbonate resin thus obtained, which is referred to as the resin $A_2$ hereinbelow, had a viscosity-average molecular weight of $1.3 \times 10^4$ and a glass transition temperature $T_g$ of 144° C.

Preparation of polycarbonate resin $A_3$

The procedure of reaction was substantially the same as in the preparation of the polycarbonate resin $A_1$ described above except that the amount of 4-cumyl phenol was phenol was increased from 0.68 mole to 1.0 mole and the amount of sodium hydroxide was increased from 31.2 g (0.78 mole) to 48.0 g (1.2 moles).

The polycarbonate resin thus obtained, which is referred to as the resin $A_3$ hereinbelow, had a viscosity-average molecular weight of $1.1 \times 10^4$ and a glass transition temperature $T_g$ of 141° C.

Preparation of polycarbonate resin $B_1$

The procedure of reaction was substantially the same as in the preparation of the polycarbonate resin $A_1$ described above except that 4-cumyl phenol was replaced with 4-tert-butyl phenol in the same molar amount.

The polycarbonate resin thus obtained, which is referred to as the resin $B_1$ hereinbelow, had a viscosity-average molecular weight of $1.5 \times 10^4$ and a glass transition temperature $T_g$ of 147° C.

Preparation of polycarbonate resin $B_2$

The procedure of reaction was substantially the same as in the preparation of the polycarbonate resin $A_1$ described above except that 0.68 mole of 4-cumyl phenol was replaced with 0.82 mole of 4-tert-butyl phenol and the amount of sodium hydroxide was increased from 31.2 g (0.78 mole) to 37.6 g (0.94 mole).

The polycarbonate resin thus obtained, which is referred to as the resin $B_2$ hereinbelow, had a viscosity-average molecular weight of $1.3 \times 10^4$ and a glass transition temperature $T_g$ of 144° C.

Preparation of polycarbonate resin $B_3$

The procedure of reaction was substantially the same as in the preparation of the polycarbonate resin $A_1$ described above except that 0.68 mole of 4-cumyl phenol was replaced with 1.0 mole of 4-tert-butyl phenol and the amount of sodium hydroxide was increased from 31.2 g (0.78 mole) to 48.0 g (1.2 moles).

The polycarbonate resin thus obtained, which is referred to as the resin $B_3$ hereinbelow, had a viscosity-average molecular weight of $1.1 \times 10^4$ and a glass transition temperature $T_g$ of 141° C.

Preparation of polycarbonate resin $C_1$

The procedure of reaction was substantially the same as in the preparation of the polycarbonate resin $A_1$ described above except that 4-cumyl phenol was replaced with phenol in the same molar amount.

The polycarbonate resin thus obtained, which is referred to as the resin $C_1$ hereinbelow, had a viscosity-average molecular weight of $1.5 \times 10^4$ and a glass transition temperature $T_g$ of 148° C.

Preparation of polycarbonate resin $C_2$

The procedure of reaction was substantially the same as in the preparation of the polycarbonate resin $A_1$ described above except that 0.68 mole of 4-cumyl phenol was replaced with 0.82 mole of phenol and the amount of sodium hydroxide was increased from 31.2 g (0.78 mole) to 37.6 g (0.94 mole).

The polycarbonate resin thus obtained, which is referred to as the resin $C_2$ hereinbelow, had a viscosity-average molecular weight of $1.3 \times 10^4$ and a glass transition temperature $T_g$ of 143° C.

Preparation of polycarbonate resin $C_3$

The procedure of reaction was substantially the same as in the preparation of the polycarbonate resin $A_1$ described above except that 0.68 mole of 4-cumyl phenol was replaced with 1.0 mole of phenol and the amount of sodium hydroxide was increased from 31.2 g (0.78 mole) to 48.0 g (1.2 moles).

The polycarbonate resin thus obtained, which is referred to as the resin $C_3$ hereinbelow, had a viscosity-average molecular weight of $1.1 \times 10^4$ and a glass transition temperature $T_g$ of 141° C.

Preparation of polycarbonate resin $D_1$

The procedure of reaction was substantially the same as in the preparation of the polycarbonate resin $A_1$ described above except that the amount of 4-cumyl phenol was increased from 0.68 mole to 1.12 moles.

The polycarbonate resin thus obtained, which is referred to as the resin $D_1$ hereinbelow, had a viscosity-average molecular weight of $9 \times 10^3$.

Preparation of polycarbonate resin $D_2$

The procedure of reaction was substantially the same as in the preparation of the polycarbonate resin $A_1$ described above except that the amount of 4-cumyl phenol was descreased from 0.68 mole to 0.44 mole.

The polycarbonate resin thus obtained, which is referred to as the resin $D_1$ hereinbelow, had a viscosity-average molecular weight of $2.0 \times 10^4$.

EXAMPLES 1 TO 3 AND COMPARATIVE EXAMPLES 1 TO 8.

Circular discs each having a diameter of 130 mm and a thickness of 1.2 mm were prepared from the resins $A_1$ to $A_3$ in Examples 1 to 3, respectively, $B_1$ to $B_3$, $C_1$ to $C_3$ and $D_1$ and $D_2$ in Comparative Examples 1 to 8, respectively, obtained in the above described manner by injection molding using a metal mold for a disc at a resin temperature of 340° C. and a mold temperature of 110° C.

The drop-weight impact strength test was undertaken for each of the molded discs kept standing for 48 hours after molding under the conditions including 3.76 kg of the load and 1 meter/second of the velocity and using a specimen holder having a major axis of 50 mm (second gate: striking inside at a distance of 18.5 mm from the center).

Table 1 below shows the energy (J) obtained in each of the drop-weight impact tests.

TABLE 1

| Resin | Viscosity-average molecular weight | Drop-weight impact strength, J |
|---|---|---|
| $A_1$ | $1.5 \times 10^4$ | 0.820 |
| $A_2$ | $1.3 \times 10^4$ | 0.235 |
| $A_3$ | $1.1 \times 10^4$ | 0.098 |
| $B_1$ | $1.5 \times 10^4$ | 0.118 |
| $B_2$ | $1.3 \times 10^4$ | 0.025 |
| $B_3$ | $1.1 \times 10^4$ | 0.010 |
| $C_1$ | $1.5 \times 10^4$ | 0.108 |
| $C_2$ | $1.3 \times 10^4$ | 0.023 |
| $C_3$ | $1.1 \times 10^4$ | 0.010 |
| $D_1$ | $9 \times 10^3$ | 0.008 |
| $D_2$ | $2.0 \times 10^4$ | 10 |

In the next place, measurement of birefringence $\Delta n$ was performed for each of the molded discs obtained from the resins $A_1$ to $A_3$, $B_1$ to $B_3$, $C_1$ to $C_3$ and $D_1$ and $D_2$ using a polarizing microscope (Model POM, manufactured by Olympus Optical Co.). Points for measurements were selected arbitrarily on four concentric contours on the disc having radii of r=27 mm, r=38 mm, r=49 mm and r=60 mm to give the values of $\Delta n27$, $\Delta n38$, $\Delta n49$ and $\Delta n60$, respectively. The results are shown in Table 2.

TABLE 2

| Resin | $\Delta n\ 27$ | $\Delta n\ 38$ | $\Delta n\ 49$ | $\Delta n\ 60$ |
|---|---|---|---|---|
| $A_1$ | 17.9 | 7.5 | 9.2 | −2.4 |
| $A_2$ | −3.5 | −5.4 | −4.0 | −4.9 |
| $A_3$ | −26.0 | −19.3 | −3.1 | −3.0 |
| $B_1$ | 18.1 | 7.8 | 9.7 | −2.3 |
| $B_2$ | −3.0 | −5.0 | −3.6 | −4.4 |
| $B_3$ | −25.4 | −18.3 | −2.9 | −2.8 |

TABLE 2-continued

| Resin | Δn 27 | Δn 38 | Δn 49 | Δn 60 |
|---|---|---|---|---|
| $C_1$ | 19.4 | 8.1 | 10.0 | −2.0 |
| $C_2$ | −3.1 | −5.1 | −3.4 | −3.2 |
| $C_3$ | −24.3 | −17.8 | −3.2 | −4.3 |
| $D_1$ | −35.0 | −28.8 | −6.4 | −5.9 |
| $D_2$ | 33.7 | 15.5 | 13.3 | −1.0 |

Measurement of the birefringence was carried out also for each of the molded discs annealed at 110° C. for 2 hours after injection molding. The results are shown in Table 3.

TABLE 3

| Resin | Δn 27 | Δn 38 | Δn 49 | Δn 60 |
|---|---|---|---|---|
| $A_1$ | 72.9 | 45.5 | 24.1 | −4.6 |
| $A_2$ | 51.4 | 32.6 | 11.0 | −5.9 |
| $A_3$ | 29.1 | 18.7 | 11.8 | −4.0 |
| $B_1$ | 73.1 | 45.7 | 24.9 | −4.4 |
| $B_2$ | 52.0 | 33.1 | 11.5 | −5.9 |
| $B_3$ | 29.8 | 19.8 | 12.4 | −4.8 |
| $C_1$ | 74.3 | 46.1 | 25.2 | −4.1 |
| $C_2$ | 51.9 | 32.7 | 11.6 | −5.0 |
| $C_3$ | 30.6 | 20.2 | 11.7 | −5.9 |
| $D_1$ | 10.1 | 8.3 | 7.5 | −5.1 |
| $D_2$ | 143.5 | 90.2 | 55.8 | 15.3 |

What is claimed is:

1. An article for use in an optical application formed of a polycarbonate resin represented by the general formula $$C_6H_5-C(CH_3)_2-C_6H_4-O-CO[O-C_6H_{(4-p)}X_p-R-C_6H_{(4-q)}X_q-O-CO]_n-O-C_6H_4-C(CH_3)_2-C_6H_5,$$

in which R is a divalent group or atom selected from the class consisting of alkylene groups having 1 to 15 carbon atoms substituted or unsubstituted with a phenyl group, alicyclic groups having 3 to 15 carbon atoms, —O—, —S—, —SO—, —SO$_2$— and —CO—, X is an alkyl or aryl group or a halogen atom and p and q are each 0, 1 or 2 and n is a positive integer having such a value that the molecules of the polycarbonate resin have a viscosity-average molecular weight in the range from 10,000 to 17,000, $C_6H_4$, $C_6H_{4-p}X_p$ and $C_6H_{4-q}X_q$ each being a substituted or unsubstituted 1,4-phenylene group.

2. An optical disc substrate formed of a polycarbonate resin represented by the general formula $$C_6H_5-C(CH_3)_2-C_6H_4-O-CO[O-C_6H_{(4-p)}X_p-R-C_6H_{(4-q)}X_q-O-CO]_n-O-C_6H_4-C(CH_3)_2-C_6H_5,$$

in which R is a divalent group or atom selected from the class consisting of alkylene groups having 1 to 15 carbon atoms substituted or unsubstituted with a phenyl group, alicyclic groups having 3 to 15 carbon atoms, —O—, —S—, —SO—, —SO$_2$— and —CO—, X is an alkyl or aryl group or a halogen atom and p and q are each 0, 1 or 2 and n is a positive integer having such a value that the molecules of the polycarbonate resin have a viscosity-average molecular weight in the range from 10,000 to 17,000, $C_6H_4$, $C_6H_{4-p}X_p$ and $C_6H_{4-q}X_q$ each being a substituted or unsubstituted 1,4-phenylene group.

3. The optical disc substrate as claimed in claim 2 wherein the polycarbonate resin is a product of a polycondensation reaction of a dihydric phenol compound represented by the general formula $$HO-C_6H_{(4-p)}X_p-R-C_6H_{(4-q)}X_q-OH$$

in which R, X, p and q each have the same meaning as defined above, and phosgene, the molecular chain terminals being capped with 4-cumyl phenol as a chain-terminal stopping agent.

4. The optical disc substrate as claimed in claim 2 wherein R is selected from the class consisting of divalent aliphatic groups having 1 to 15 carbon atoms unsubstituted or substituted by a phenyl group and divalent alicyclic groups having 3 to 15 carbon atoms.

5. The optical disc substrate as claimed in claim 2 wherein X is selected from the class consisting of alkyl groups, aryl groups and halogen atoms.

6. The optical disc substrate as claimed in claim 3 wherein the dihydric phenol compound is selected from the class consisting of bis(4-hydroxyphenyl) methane, bis(4-hydroxyphenyl) ether, bis(4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl) ethane, 2,2-bis(4-hydroxyphenyl) propane, 2,2-bis(4-hydroxyphenyl) butane, 1,1-bis(4-hydroxyphenyl) cyclohexane, 2,2-bis(4-hydroxy-3,5-dibromophenyl) propane, 2,2-bis(4-hydroxy-3,5-dichlorophenyl) propane, 2,2-bis(4-hydroxy-3-bromophenyl) propane, 2,2-bis(4-hydroxy-3-chlorophenyl) propane, 2,2-bis(4-hydroxy-3,5-dimethyl phenyl) propane, 1,1-bis(4-hydroxyphenyl)-1-phenyl ethane and bis(4-hydroxyphenyl) diphenyl methane.

7. The optical disc substrate as claimed in claim 6 wherein the dihydric phenol compound is 2,2-bis(4-hydroxyphenyl) propane.

* * * * *

Adverse Decisions in Interference

Patent No. 4,997,903, Masaya Okamoto, POLYCARBONATE-MADE OPTICAL ARTICLE, Interference No. 103,272, final judgment adverse to the patentee rendered September 30, 1998, as to claims 1-7.

*(Official Gazette May 25, 1999)*

Adverse Decisions in Interference

Patent No. 4,997,903, Masaya Okamoto, POLYCARBONATE-MADE OPTICAL ARTICLE, Interference No. 103,272, final judgment adverse to the patentee rendered September 30, 1998, as to claims 1-7.

*(Official Gazette June 8, 1999)*